United States Patent
Sheller et al.

(10) Patent No.: US 9,450,931 B2
(45) Date of Patent: Sep. 20, 2016

(54) REDUCING AUTHENTICATION CONFIDENCE OVER TIME BASED ON USER HISTORY

(71) Applicant: Intel Corporation, Santa Clara, CA (US)

(72) Inventors: Micah Sheller, Hillsboro, OR (US); Conor Cahill, Waterford, VA (US); Jason Martin, Beaverton, OR (US); Brandon Baker, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 62 days.

(21) Appl. No.: 13/840,572

(22) Filed: Mar. 15, 2013

(65) Prior Publication Data

US 2014/0282893 A1 Sep. 18, 2014

(51) Int. Cl.
G06F 7/04 (2006.01)
H04L 29/06 (2006.01)
G06F 21/31 (2013.01)
G06F 21/57 (2013.01)

(52) U.S. Cl.
CPC ............ H04L 63/08 (2013.01); G06F 21/31 (2013.01); *G06F 21/57* (2013.01); *G06F 2221/2101* (2013.01); *G06F 2221/2113* (2013.01); *G06F 2221/2137* (2013.01); *G06F 2221/2151* (2013.01)

(58) Field of Classification Search
CPC .............. G06F 21/31; G06F 21/57; G06F 2221/2101; G06F 2221/2113; G06F 2221/2137; G06F 2221/2151
USPC .......................................................... 726/4
See application file for complete search history.

(56) References Cited

U.S. PATENT DOCUMENTS 6,055,637 A 4/2000 Hudson et al.
7,039,951 B1 5/2006 Chaudhari et al.
(Continued)

FOREIGN PATENT DOCUMENTS

EP 1224518 B1 7/2009
KR 10-2011-0002967 1/2011
(Continued)

OTHER PUBLICATIONS

Sheng Zhang, et al., "Continuous Verification Using Multimodal Biometrics," D. Zhang and A.K. Jain (Eds.): ICB 2006, LNCS 3232 (2005), pp. 562-570, 9 pages.*
(Continued)

*Primary Examiner* — Ashok Patel
*Assistant Examiner* — Gary Gracia
(74) *Attorney, Agent, or Firm* — Patent Capital Group

(57) ABSTRACT

Technologies are provided in embodiments to manage an authentication confirmation score. Embodiments are configured to identify, in absolute session time, a beginning time and an ending time of an interval of an active user session on a client. Embodiments are also configured to determine a first value representing a first subset of a set of prior user sessions, where the prior user sessions of the first subset were active for at least as long as the beginning time. Embodiments can also determine a second value representing a second subset of the set of prior user sessions, where the prior user sessions of the second subset were active for at least as long as the ending time. Embodiments also determine, based on the first and second values, a decay rate for the authentication confidence score of the active user session. In some embodiments, the set is based on context attributes.

21 Claims, 6 Drawing Sheets

(56) References Cited

U.S. PATENT DOCUMENTS

| | | | |
|---|---|---|---|
| 8,782,775 | B2 | 7/2014 | Fadell et al. |
| 9,119,539 | B1* | 9/2015 | Dotan et al. ....... A61B 5/02438 |
| 9,137,247 | B2 | 9/2015 | Smith et al. |
| 9,160,730 | B2* | 10/2015 | Sheller et al. ......... H04L 63/08 |
| 2003/0154406 | A1 | 8/2003 | Honarvar et al. |
| 2003/0218534 | A1 | 11/2003 | LaCous |
| 2004/0083394 | A1* | 4/2004 | Brebner ................. G06F 21/31 726/19 |
| 2004/0153656 | A1* | 8/2004 | Cluts et al. ............. G06F 21/31 713/186 |
| 2004/0212677 | A1 | 10/2004 | Uebbing |
| 2006/0062427 | A1 | 3/2006 | Burkhart et al. |
| 2006/0156385 | A1 | 7/2006 | Chiviendacz et al. |
| 2008/0019573 | A1 | 1/2008 | Baltatu et al. |
| 2008/0056539 | A1 | 3/2008 | Sweeney et al. |
| 2008/0263637 | A1* | 10/2008 | Nonaka et al. .................... 726/4 |
| 2009/0063869 | A1 | 3/2009 | Kohavi et al. |
| 2009/0199264 | A1* | 8/2009 | Lang ....................... G06F 21/31 726/1 |
| 2010/0094767 | A1* | 4/2010 | Miltonberger ....... G06Q 10/067 705/325 |
| 2010/0100947 | A1 | 4/2010 | Ciet et al. |
| 2010/0246902 | A1 | 9/2010 | Rowe et al. |
| 2011/0016534 | A1 | 1/2011 | Jakobsson et al. |
| 2011/0068268 | A1 | 3/2011 | Heidari |
| 2011/0072508 | A1* | 3/2011 | Agarwal ............. H04L 63/0227 726/13 |
| 2011/0224986 | A1 | 9/2011 | Summerfield |
| 2011/0289564 | A1 | 11/2011 | Archer et al. |
| 2011/0302653 | A1* | 12/2011 | Frantz et al. ..................... 726/22 |
| 2012/0159184 | A1 | 6/2012 | Johnson et al. |
| 2012/0210333 | A1 | 8/2012 | Potter et al. |
| 2012/0253930 | A1* | 10/2012 | Gao et al. ................... 705/14.53 |
| 2013/0010335 | A1 | 1/2013 | Baba et al. |
| 2013/0036480 | A1 | 2/2013 | Anderson et al. |
| 2013/0038426 | A1* | 2/2013 | Yamada .................... G06K 9/00 340/5.82 |
| 2013/0047226 | A1 | 2/2013 | Radhakrishnan et al. |
| 2013/0055348 | A1 | 2/2013 | Strauss et al. |
| 2013/0067547 | A1 | 3/2013 | Thavasi et al. |
| 2013/0074142 | A1 | 3/2013 | Brennan et al. |
| 2013/0117804 | A1 | 5/2013 | Chawla et al. |
| 2013/0147972 | A1 | 6/2013 | Niinuma et al. |
| 2013/0167207 | A1* | 6/2013 | Davis et al. ........................ 726/5 |
| 2013/0198832 | A1 | 8/2013 | Draluk et al. |
| 2013/0225129 | A1* | 8/2013 | Norbisrath et al. .... G06F 21/32 455/411 |
| 2013/0227700 | A1* | 8/2013 | Dhillon .................. G06Q 50/01 726/26 |
| 2013/0268994 | A1* | 10/2013 | Cooper et al. ...................... 726/1 |
| 2014/0118520 | A1 | 5/2014 | Slaby et al. |
| 2014/0156744 | A1* | 6/2014 | Hua et al. ...................... 709/204 |
| 2014/0250137 | A1* | 9/2014 | Stout et al. .................... 707/748 |
| 2014/0282868 | A1 | 9/2014 | Sheller et al. |
| 2014/0282945 | A1 | 9/2014 | Smith et al. |
| 2014/0366111 | A1 | 12/2014 | Sheller et al. |

FOREIGN PATENT DOCUMENTS

| | | |
|---|---|---|
| WO | 2009/042392 A2 | 4/2009 |
| WO | 2010/123385 A1 | 10/2010 |
| WO | 2014/142941 A1 | 9/2014 |
| WO | 2014/142947 A1 | 9/2014 |
| WO | 2014/144602 A1 | 9/2014 |
| WO | 2014/150129 A1 | 9/2014 |

OTHER PUBLICATIONS

International Search Report and Written Opinion received for PCT Patent Application No. PCT/US2013/031881, mailed on Dec. 26, 2013, 10 pages.

Sheller, et al., "Continuous Authentication Confidence Module", PCT Application No. PCT/US2013/031919, filed on Mar. 15, 2013, 55 pages.

Smith, et al., "Technologies for Secure Storage and Use of Biometric Authentication Information", PCT Application No. PCT/US2013/031881, filed on Mar. 15, 2013, 50 pages.

Sheller, et al., "Continuous Authentication Confidence Module", U.S. Appl. No. 13/994,016, filed Jun. 13, 2013, 55 pages.

Smith, et al., "Technologies for Secure Storage and Use of Biometric Authentication Information", U.S. Appl. No. 13/995,247, filed Jun. 18, 2013, 50 pages.

Sheller, et al., "Method and Apparatus to Effect Re-Authentication", PCT Application No. PCT/US2014/022327, filed on Mar. 10, 2014, 36 pages.

Sheller, et al., "Method and Apparatus to Effect Re-Authentication", U.S. Appl. No. 13/832,556, filed Mar. 15, 2013, 39 pages.

Non-Final Office Action received for U.S. Appl. No. 13/995,247, mailed on Sep. 19, 2014, 16 pages.

International Search Report received for PCT Patent Application No. PCT/US2013/031919, mailed on Dec. 16, 2013, 3 pages.

International Search Report received for PCT Patent Application No. PCT/US2014/022327, mailed on Jul. 18, 2014, 3 pages.

International Search Report and Written Opinion received for PCT Patent Application No. PCT/US2014/029080, mailed on Jul. 31, 2014, 11 pages.

USPTO Dec. 23, 2014 Notice of Allowance in U.S. Appl. No. 13/995,247, 9 pages.

USPTO Nov. 20, 2014 Nonfinal Rejection in U.S. Appl. No. 13/832,556, 18 pages.

Bare, Christopher J., "Attestation and Trusted Computing," CSEP 590: Practical Aspects of Modern Cryptography, Mar. 2006, pp. 1-10, 10 pages.

USPTO Mar. 25, 2015 Nonfinal Rejection in U.S. Appl. No. 13/994,016, 11 pages.

Brickell, et al., "Direct Anonymous Attestation," CCS 4, Washington, DC (Oct. 2004), pp. 132-145, 14 pages.

Brickell, et al., "Enhanced Privacy ID: A Direct Anonymous Attestation Scheme with Enhanced Revocation Capabilities," 6th Workshop of Privacy in the Electronic Society (WPES), Alexandria, Virginia (Oct. 2007), pp. 21-30, 10 pages.

Krawczyk, Hugo, "SIGMA: the SIGn-andMAc' Approach to Authenticated Diffie-Hellman and its Use in the IKE Protocols," EE Department, Technion, Haifa, Israel, and IBM T.J. Watson Research Center, (2003), pp. 399-424, 26 pages.

Giot, Romain, et al., (2011) Keystroke Dynamics Overview, Biometrics, Dr. Jucheng Yang (Ed.), ISBN: 978-953-307-618-8, InTech, pp. 157-182. Available from: http://www.intechopen.com/books/biometrics/keystroke-dynamics-overview, 27 pages.

Klosterman, Andrew J., et al., "Secure continuous biometric-enhanced authentication" (2000). Computer Science Department. Paper 2113 http://repository.cmu.edu/compsci/2113, 27 pages.

Ulery, Brad, et al,. "Studies of Biometric Fusion," National Institute of Standards and Technology, Technology Administration, U.S. Department of Commerce, NISIR 7346 (Sep. 2006), 26 pages.

Yap, Roland H.C., et al., "Physical Access Protection using Continuous Authentication," 978-1-4244-1978-4/08, ©2008 IEEE, pp. 510-512, 3 pages.

Shi, Elaine, et al., "Implicit Authentication through Learning User Behavior," 16 pages.

Yan, Jing, "Continuous Authentication Based on Computer Security," Lulea University of Technology, Master Thesis, Continuation Course, Computer and Systems Science, Department of Business Administration and Social Sciences, Division of Information System Science, 2009:005 —ISSN: 1653-0187 —ISRN: LTU-PB-EX-09/005-SE (May 2008), 82 pages.

USPTO Jun. 10, 2015 Notice of Allowance in U.S. Appl. No. 13/994,016, 8 pages.

Dirk Balfanz. "FIDO U2F Raw Message Formats", FIDO Alliance Proposed Standard, May 14, 2015, pp. 1-10, FIDO Alliance, 10 pages.

Rolf Lindemann, "FIDO Security Reference", FIDO Alliance Proposed Standard, May 14, 2015, pp. 1-30, FIDO Alliance, 30 pages.

Dirk Balfanz, "FIDO U2F Implementation Considerations", FIDO Alliance Proposed Standard, May 14, 2015, pp. 1-5, FIDO Alliance, 5 pages.

(56) References Cited

OTHER PUBLICATIONS

Dirk Balfanz, "FIDO U2F Javascript API", FIDO Alliance Proposed Standard, May 14, 2015, pp. 1-7, FIDO Alliance, 7 pages.
Alexei Czeskis, "FIDO NFC Protocol Specification v1.0", FIDO Alliance Proposed Standard, May 14, 2015, pp. 1-5, FIDO Alliance, 5 pages.
Sampath Srinivas, "Universal 2nd Factor (U2F) Overview", FIDO Alliance Proposed Standard, May 14, 2015, FIDO Alliance, 16 pages.
Salah Machani, et al., "FIDO UAF Review Draft Spec Set", FIDO Alliance Proposed Standard, Dec. 8, 2014, pp. 1-202, 202 pages.
USPTO Apr. 14, 2015 Notice of Allowance in U.S. Appl. No. 13/995,247, 9 pages.
USPTO Mar. 31, 2015 Nonfinal Rejection in U.S. Appl. No. 13/832,556, 22 pages.
USPTO Jul. 30, 2015 Nonfinal Rejection in U.S. Appl. No. 13/832,556, 21 pages.
International Preliminary Report on Patentability received for PCT Patent Application No. PCT/US2014/029080, mailed on Sep. 15, 2015, 7 pages.
USPTO Dec. 10, 2015 Final Rejection in U.S. Appl. No. 13/832,556, 20 pages.
USPTO Apr. 25, 2016 Nonfinal Rejection in U.S. Appl. No. 13/832,556, 22 pages.

\* cited by examiner

REDUCING AUTHENTICATION CONFIDENCE OVER TIME BASED ON USER HISTORY

RELATED APPLICATIONS

This patent application is related to the following commonly-owned, co-pending patent applications: U.S. patent application Ser. No. 13/994,016, entitled "CONTINUOUS AUTHENTICATION CONFIDENCE MODULE," which is the national stage entry under 35 U.S.C. §371 of the international application No. PCT/US2013/031919, filed on Mar. 15, 2013, naming Micah J. Sheller, et al. as inventors, now issued as U.S. Pat. No. 9,160,730; U.S. patent application Ser. No. 13/995,247, entitled "TECHNOLOGIES FOR SECURE STORAGE AND USE OF BIOMETRIC AUTHENTICATION INFORMATION," which is the national stage entry under 35 U.S.C. §371 of international application No. PCT/US2013/031881, filed on Mar. 15, 2013, naming Ned M. Smith, et al. as inventors, now issued as U.S. Pat. No. 9,137,247; and U.S. patent application Ser. No. 13/832,556, entitled "METHOD AND APPARATUS TO EFFECT RE-AUTHENTICATION," filed on Mar. 15, 2013, naming Micah Sheller, et al. as inventors.

TECHNICAL FIELD

This disclosure relates in general to the field of computer security, and more particularly, to reducing authentication confidence over time based on user history.

BACKGROUND

The field of computer security has become increasingly important in today's society. Client-based user authentication can be implemented in client platforms in virtually every computing environment. User authentication is typically employed to prevent unauthorized persons from accessing a client platform. Client platforms configured in any type of network, as well as standalone client platforms (e.g., an individual's personal mobile device) may use some type of authentication to prevent unauthorized access to confidential work or personal information, and to prevent unauthorized use of the clients. A common approach to client-based user authentication involves a password or personal identification number (PIN) that may or may not need to be accompanied by a username. Nevertheless, some malicious users may still attempt to subvert user authentication by gaining access to a client platform after a user has been authenticated on the client platform. Thus, network security administrators and individuals alike face significant challenges in protecting computers from malicious persons who seek to gain unauthorized access to client platforms.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Example Embodiments

Figure 1:
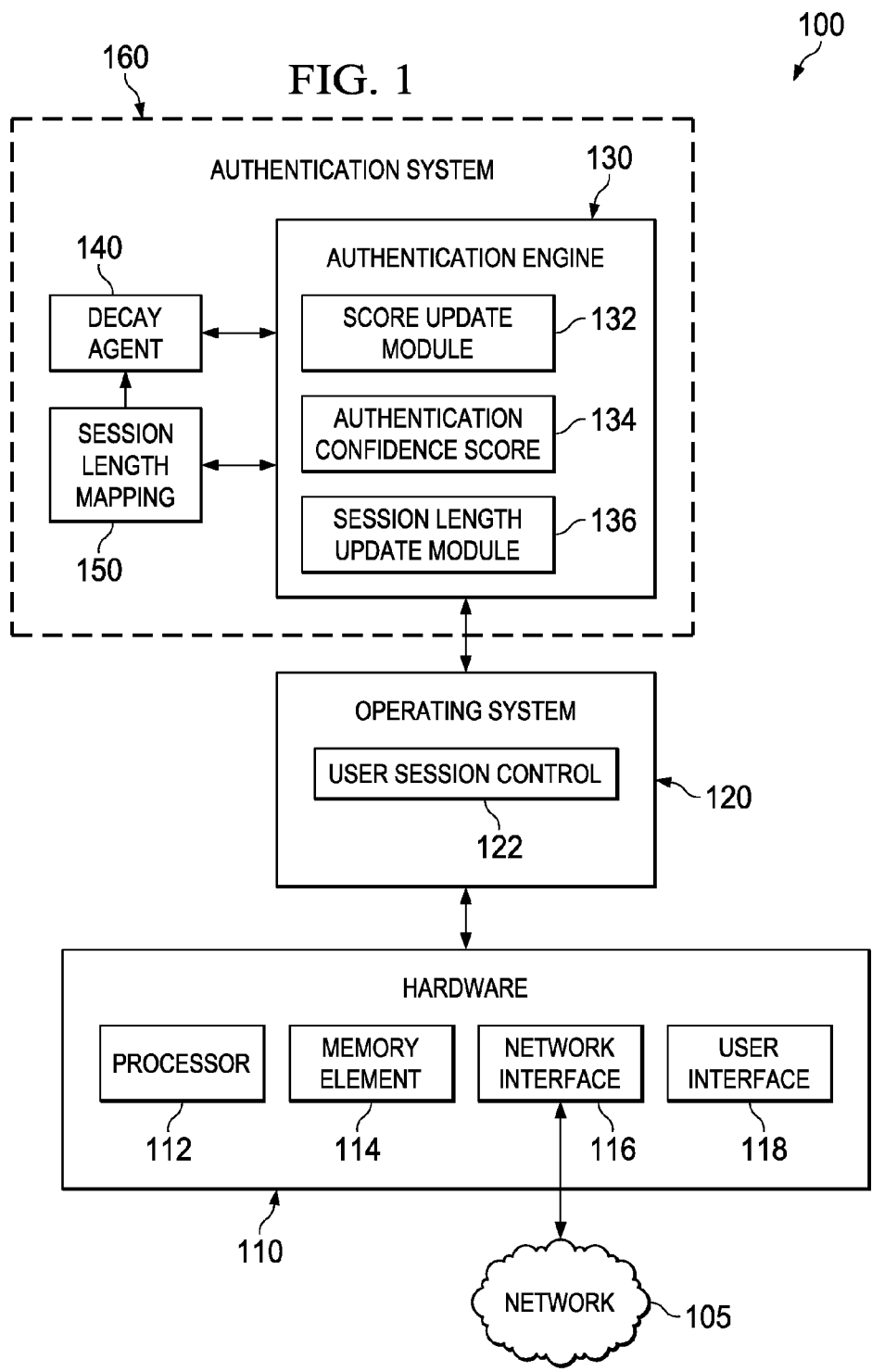
FIG. 1 is a simplified block diagram of a client platform with an authentication system in accordance with an embodiment of the present disclosure.

FIG. 1 is a simplified block diagram of a client platform 100 in which an authentication system 160 based on a continuous authentication model is implemented. Client platform 100 (also referred to herein as 'client') can include hardware 110 and an operating system 120. A user session control 122 may be provided in operating system 120 to control active user sessions and provide notifications when user sessions begin and end. Hardware 110 may include, but is not limited to, one or more processors 112, memory elements 114, and network interface devices 114. Additionally, hardware 110 may include a user interface 118 through which a user can interact with client 100. In at least one embodiment, authentication system 160 may be implemented in client 100 in the form of an authentication engine 130 and a decay agent 140, which enable reducing authentication confidence over time based on user history. Authentication engine 130 can include score update module 132. Data representing a current authentication confidence score 134 of a currently active user session may be determined by authentication engine 130 and may be stored in client 100. In at least one embodiment, authentication engine 130 may also include a session length update module 136 for updating session length mapping 150 with new session length data when user sessions on client 100 terminate. Session length mapping 150 may be contained in any suitable storage structure of client 100, or in another device accessible to client 100. Decay agent 140 may use session length mapping 150 to determine a decay rate for authentication confidence score 134. Decay agent 140 may communicate the decay rate to authentication engine 130 to enable score update module 132 to update authentication confidence score 134, if needed.

One or more network interfaces 116 of client platform 100 may be configured to enable wireless or wire line communication between client platform 100 and other client platforms, network elements, electronic devices, and networks via one or more networks, such as network 105. Additionally, radio signal communications over a cellular network may also be provided in network 105. Suitable interfaces and infrastructure may be provided to enable communication with the cellular network.

For purposes of illustrating certain example techniques of authentication system 160, it is important to understand the activities that may be occurring in the computing environment. The following foundational information may be viewed as a basis from which the present disclosure may be properly explained.

Client platforms are typically protected by some type of user authentication to prevent unauthorized users from gaining access to the devices. Client platforms used by employees of an enterprise, government, or other entity, for example, may contain confidential or sensitive information that could cause considerable damage to the organization or associated individuals if stolen or accessed without permission. In addition, individuals may have personal and other confidential data on their client platforms that needs protection.

Typically, a time-out mechanism is configured on a client with client-based user authentication to require re-authentication by the user after a predetermined period of inactivity on the client. The time-out mechanism can protect a client when a user inadvertently leaves the client unattended without logging off from an authorized session. The usefulness of a time-out mechanism, however, can be offset by the inconvenience to the user. Generally, the shorter the time-out is configured, the more effective the time-out can be at preventing unauthorized access to the client. When a time-out is too short, however, it can result in a user needing to login frequently due to unnecessary time-outs, thus becoming a nuisance. Conversely, a longer time-out increases the risk of unauthorized access of the client.

One technique that has addressed these issues to some extent is a continuous authentication technique. Continuous authentication may be used with behavioral analysis of keyboard and mouse dynamics, for example, and may continuously perform checks to determine whether the user is still present at the client. Continuous authentication models typically involve an authentication confidence score (also referred to herein as 'confidence score' and 'score'). In an example scenario, an initial authentication of a user may be used to establish an authentication confidence score. Subsequently, various events can either cause the score to increase or to decrease. As used herein, a 'restored authentication' is intended to mean an authentication confidence score that has been increased based on at least one event. Also as used herein, 'decayed authentication' is intended to mean an authentication confidence score that has been decreased (or decayed) based on at least one event. If the score is decayed below a certain defined threshold, then appropriate action may be taken, such as terminating the user session.

The passage of time is a particularly common event that can cause an authentication confidence score to decay. Generally, an authentication credential is considered valid for some limited, defined time period. Methods used to determine how and when to decay a score based on time, however, are generally not based on real world activities. Rather, scores may be decayed based on randomly generated rates of decay, or rates of decay derived from equations (e.g., polynomials) that are not necessarily based on real world events.

An authentication system in a computing environment, as outlined in FIG. 1 can resolve these issues and others. In authentication system 160 of FIG. 1, an algorithm is implemented to reduce an authentication confidence score on a client in accordance with actual user behavior associated with the client. Actual user behavior or habits associated with a client can be determined based on historical session length data, which may be updated in a session length mapping each time a user ends a session on the client. The session length mapping maps time since a start of a session (referred to as 'absolute session time') to a value that represents prior user sessions that ran for at least the same amount of time.

The session length history data contained in the session length mapping can be used to determine the probability that if a user was on a client at session time $t_0$, that the user is still on the client at time $t_1$. This probability is also referred to herein as a 'decay rate' and can be used to reduce an authentication confidence score when the absolute session time of the active user session passes a typical time when the user completes certain tasks. Over time, as more and more session length data is provided to the session length mapping, the authentication system can begin to more accurately identify certain lengths of absolute session time that correspond to the actual things the user does with the client. Therefore, the authentication confidence score can be reduced in accordance with the actual user behavior.

Turning again to FIG. 1, authentication system 160, implemented in client platform 100, can reduce an authentication confidence score for a user session based on user history. Before discussing potential flows associated with the architecture of FIG. 1, a brief discussion is provided about some of the possible components and infrastructure that may be associated with client platform 100.

Generally, client platform 100 can be implemented in any type or topology of networks, indicated by network 105. Network 105 represents a series of points or nodes of interconnected communication paths for receiving and sending network communications that propagate through network 105. Network 105 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wireless (e.g., 3G/4G/5G/nG network, WiFi, Institute of Electrical and Electronics Engineers (IEEE) Std 802.11™-2012, published Mar. 29, 2012, WiMax, IEEE Std 802.16™-2012, published Aug. 17, 2012, Radio-frequency Identification (RFID), Near Field Communication (NFC), Bluetooth™, etc.) and/or wire line (e.g., Ethernet, etc.) communication.

Network communications, which can be inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). The term 'data' as used herein, refers to any type of binary, numeric, voice, video, textual, or script data, or any type of source or object code, or any other suitable information in any appropriate format that may be communicated from one point to another in computing devices (e.g., clients) and/or networks.

Client platforms, such as client 100, can include any type of computing device that permits user interaction via a user interface including, but not limited to, workstations, terminals, laptops, desktops, tablets, gaming systems, any mobile device, and smartphones. Regarding the internal structure associated with client 100, client 100 can include volatile and/or nonvolatile memory elements (e.g., memory element 114) for storing data and information, including instructions, logic, and/or code, to be used in the operations outlined herein. Client 100 may keep data and information in any suitable memory element (e.g., random access memory (RAM), read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, an application specific integrated circuit (ASIC), or other types of nonvolatile machine-readable media that are capable of storing data and information), software, hardware, firmware, or in any other suitable component, device, element, or object where appropriate and based on particular needs. Any of the memory items discussed herein (e.g., memory element 114) should be construed as being encompassed within the broad term 'memory element.' Moreover, the information being used, tracked, sent, or received in client 100 could be provided in any storage structure including, but not limited to, a repository, database, register, queue, table, cache, control list, or Bayesian network with a Gaussian mixture node, all of which could be referenced at any suitable timeframe. Any such storage structures (e.g., storage structure containing session length mapping 150) may also be included within the broad term 'memory element' as used herein.

In an example implementation, client 100 may include software modules (e.g., decay agent 140, authentication engine 130, score update module 132, session length update module 136) to achieve, or to foster, operations as outlined herein. These modules may be suitably combined or partitioned in any appropriate manner, which may be based on particular configuration and/or provisioning needs. In some embodiments, one or more of such operations may be carried out by hardware and/or firmware, implemented externally to these elements, or included in some other computing device to achieve the intended functionality. These elements may also include software (or reciprocating software) that can coordinate with other computing devices in order to achieve the operations, as outlined herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. Client 100 may include one or more processors (e.g., processor 112) that can execute logic or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Operating system 120 of client platform 100 can be provided to manage the hardware and software resources of client platform 100. In particular, operating system 120 may be configured with user session control 122 to manage user sessions on client 100. As used herein, a 'user session' is intended to mean an enabled interactive information exchange between a client and a user. A user session can be established at a point in time when a user is authenticated to a client platform. Authentication is a process for verifying the identity of a user and it may be achieved using any number of known techniques. For example, authentication techniques could include, but are not limited to, a simple logon (e.g., username and password supplied by a user), tokens, public key certificates, or biometrics. The established user session remains active until it is terminated. The user session can be terminated when a user logs off of the client, when user session control 122 terminates the user session (e.g., due to a time-out mechanism or other authentication event), or when power is interrupted on the client. The amount of time between a start time and an end time of a user session is referred to herein as 'session length.'

Authentication system 160 may be implemented in client platform 100, and in at least one embodiment, may include authentication engine 130, decay agent 140, and session length mapping 150. In at least one embodiment, session length mapping 150 may be updated with new session length data each time a user session on client 100 ends.

In an embodiment, session length mapping 150 includes session length data of all prior user sessions on client 100. In at least one other embodiment, session length mapping 150 includes session length data of all prior user sessions identified in system logs (e.g., syslog files) of client 100. In some embodiments, session length mapping 150 includes session length data of selected prior user sessions. For example, prior user sessions from particular time periods (e.g., during the last year) or prior user sessions associated with a particular user when multiple users share a client.

In some instances, for at least some period of time, session length mapping 150 may include session length data that is not based on prior user sessions of client 100. For example, one or more session length templates may be used to configure session length mapping 150 in order to allow authentication system 160 to be implemented with a default user profile having a pre-configured session length mapping as a starting point. This template may be used at least until authentication system 160 learns the actual user patterns based on actual user sessions established by the user. Moreover, such templates may be customized based on particular users, groups of users, departments within an organization, etc.

In order to create these universal profiles, session length data for clients of various device types could be generated from a selected group of devices. The data may be generated, for example, from system log files of the devices. Additionally, a tool could be deployed on the devices to generate the data. Any type of authentication mechanism could be used on the devices from which the user session length data is generated. Furthermore, statistical analysis may be performed on the extracted user session length data to determine profile types.

Numerous other techniques may also be used to provide a starting point for session length mapping 150, at least until the client learns the user's patterns. In one example, a selected polynomial may be used to provide session length data. However, a polynomial could result in numbers with little or no correlation to real world user activities. In another example, historical records of the client (e.g., system log files) may be processed to build session length mapping 150 when authentication system 160 is implemented in the client, or at any other time if needed. Additionally, if a user acquires a new client platform, session length mapping 150 from the old client platform may be transferred or copied to the new client platform.

In at least one embodiment, session length mapping 150 contains absolute session times and session length data associated with a set of prior user sessions. As used herein, 'absolute session time' is intended to refer to time relative to the start of a session. Session length mapping 150 can be configured to map an absolute session time to a value that represents a subset of the set of prior user sessions, where each of the prior user sessions of the subset were active for at least as long as the absolute session time. When session length mapping 150 contains values and times based on actual prior user sessions of the set, this mapping may be repeated for each absolute session time, using any time format (e.g., seconds, minutes, etc.), of a session length of the longest prior user session of the set of prior user sessions. Furthermore, session length mapping 150 could contain mappings for additional absolute session times of session lengths longer than the longest prior user session of the set. Such additional mappings could be based on predictions of likelihoods of sessions longer than any previous session, data from prior user sessions from other clients, etc.

For illustration purposes, assume a simplistic set of 250 prior user sessions, with only 20 of the 250 prior user sessions lasting 30 minutes or more. In this example illustration, an absolute session time t, which equals 30 minutes, can be mapped to a value representing the subset (i.e., the 20 prior user sessions) that ran at least as long as time t when they were active sessions. In at least one embodiment, the value mapped to an absolute session time could be a percentage, represented by the subset, of the set of prior user sessions. Accordingly, in the example illustration, the value mapped to t could be 8%. In another embodiment, the value mapped to an absolute session time could be an absolute number of the one or more prior user sessions of the subset associated with that session time. Accordingly, in the example illustration, the value mapped to t could be 20. Other values that provide the same ratio may also be used to represent the subsets at various absolute session times.

The mapping described with reference to session length mapping 150, may be achieved using any suitable mapping, marking, or linking technique (e.g., pointers, indexes, file names, relational databases, hash table, etc.), or any other technique that represents a relation, connection, or link between the 'mapped' items. For example, a simple table configuration, which is generally a data structure used to organize electronic information, is one possible way to implement session length mapping 150, as previously described. It will be appreciated, however, that session length mapping 150 could be modeled in various other ways, such as a Gaussian mixture. Such an implementation may be desirable in certain embodiments to due to system space limitations, for example.

In at least one embodiment, session length mapping 150 contains absolute session times, and two or more sets of session length data, which are associated with two or more sets of prior user sessions, respectively. In this embodiment, the two or more sets of prior user sessions are distinguished by context attributes, or a combination of context attributes. Context attributes can include any detectable condition under which user session lengths may vary. Examples of context attributes can include, but are not limited to, time of day (e.g., exact such as 8:15 am or course such as 'morning'), day of a selected period of days (e.g. day of week, day of year, day of month, day of quarter, etc.), location of the client (e.g., Global Positioning System (GPS), WiFi triangulation, home, work, park, commute, etc.), position of client (e.g., pocket, hand, backpack, purse, table, normal to the earth, etc.), position or activity of user (e.g., walking, running, sitting, etc.), a type of document being accessed (e.g., work documents, personal documents, pictures, etc.), a type of application being executed (e.g., word processing, browser, video games, social media, etc.), weather, ambient light, a network to which the client is connected, and a device to which the client is connected.

The use of multiple tables is one possible way to implement session length mapping 150 with two or more sets of session length data. When context attributes are involved, session length mapping 150 may be configured to maintain a separate context-based mapping group (of absolute session times mapped to values, as previously described herein) for each set of session length data. Accordingly, a separate table could be configured for each context-based mapping group.

In another example, session length mapping 150 could be configured, at least in part, to accommodate the potentially enormous amount of data that could be collected when session length data is grouped according to context attributes. Known machine learning techniques may be used to filter session length data of prior user sessions based on different context attributes or combinations of context attributes. Such machine learning techniques could include a decision tree or Bayesian Network. A possible implementation of a model that incorporates context attributes and different sets of session length data could be a Bayesian network with discrete nodes for the context attributes with one Gaussian mixture node representing the sets of session length data.

In at least one embodiment, session length mapping 150 could be updated with new session length data each time a session ends. Thus, session length mapping 150 may be changed with each session and improved to more precisely represent the particular user's behavior patterns. An example pseudo-code representation of an algorithm to achieve these updates could be the following:

```
OnSessionEnd(current_time, session_length_mapping)
    for i = 0 to current_time
        session_length_mapping [i]++
```

In this pseudo-code, the variables are the following:

```
current_time = absolute session time that the user session ended
session_length_mapping = session length mapping 150
```

In an algorithm represented by the above pseudo-code, each time a user session ends, the portion of session length mapping 150 that corresponds to how long the user session lasted is increased. For example, if the user session lasted 30 seconds, then all of the absolute session times from 0 to 30 seconds, in session length mapping 150, would be increased. In one embodiment, an absolute number of sessions may be increased for each absolute session time from 0 to 30 seconds. In other embodiments, different values could be increased. For example, if percentages are used, then for each absolute session time from 0 to 30, the corresponding percentage could be appropriately increased based on one additional user session lasting at least that long.

Other known machine learning may also be implemented in at least one embodiment. For example, a recovery algorithm may be provided to detect when the user's behavior has dramatically changed, for example, due to a lifestyle change (e.g., new job, retirement, etc.). In this scenario, old session length data may be deleted and new session length data may be used to rebuild session length mapping 150 to accurately represent the user's new use patterns.

In at least one embodiment, updating session length mapping 150 may be achieved by session length update module 136 of authentication engine 130. Session length update module 130 could have a hook from operating system 120 to enable it to receive a notification each time a user session ends. It will be apparent, however, that any component authorized to receive such notifications could be configured to update session length mapping 150. For example, decay agent 140 may be configured to receive notifications and update the data. In other examples, a service provider may send these notifications through network 105 and network interface 116. In other examples, notifications may be provided from several sources (e.g., operating system 120, a service provider, etc.) to an entity such as authentication engine 130. The various notifications may be aggregated and used to update session length mapping 150.

In an embodiment, authentication engine 130 may also include score update module 132 for reducing (or decaying) an authentication confidence score of an active user session. Authentication confidence score 134 represents a current authentication confidence score of an active user session. A score may be created when a user session is established and it may be stored and updated at least as long as the user session is active. Once the user session ends, in at least some embodiments, the score may be deleted. Generally, an authentication confidence score can be configured as a numerical representation of a confidence level of whether the authorized user is still present at client 100. As time passes, the confidence level may be reduced absent other evidence that can restore authentication.

In one example, authentication engine 130 may request a new decay rate from decay agent 140 each time it is determined that the authentication confidence score needs to be updated. Decay agent 140 can be configured to pull data from session length mapping 150 to calculate a decay rate. In at least some embodiments, a decay rate is the probability that, if the user was on the system at a first session time ($t_0$), the user is still on the system at a later session time ($t_1$). The following variables may be used when calculating a decay rate and an updated authentication confidence score at $t_1$ based on the decay rate:

$t_0$=Session time of last positive authentication
$v_0$=Value of prior user sessions that lasted until at least $t_0$
$s_0$=Authentication confidence score at $t_0$
$t_1$=Session time for which a decay rate is desired (e.g., current or future session time)
$v_1$=Value of prior user sessions that lasted until at least $t_1$
$s_1$=Authentication confidence score at $t_1$
P=Probability based on user history that if the user was on the system at session time $t_0$, the user is still on the system at time $t_1$ In an embodiment, the time values, $t_0$ and $t_1$ may be provided to decay agent 140 by authentication engine 130. The time values, $t_0$ and $t_1$, may be beginning and ending times, respectively, of an interval of an active user session. A decay rate may be requested based on an interval where the beginning time ($t_0$) is the absolute session time of the last positive authentication and the ending time ($t_1$) is the current absolute session time. In an example, the last positive authentication could be the last session time for which a decay rate was calculated and applied to the authentication confidence score. The last positive authentication could also be the last time the authentication confidence score was restored either fully or partially by other evidence that the user is present.

Decay agent 140 can obtain values, $v_0$ and $v_1$, from session length mapping 150. Time $t_0$ is an absolute session time mapped to a value (e.g., a percentage, an absolute number) that represents one or more prior user sessions that lasted at least as long as time $t_0$ when they were active sessions. Similarly, time $t_1$ is an absolute session time mapped to a value (e.g., a percentage, an absolute number) that represents one or more prior user sessions that lasted at least as long as time $t_1$ when they were active sessions. Thus, decay agent 140 could use times $t_0$ and $t_1$ to query session length mapping 150 for the corresponding values $v_0$ and $v_1$. The one or more prior user sessions mapped to $t_0$ and the one or more prior user sessions mapped to $t_1$ could be subsets of a set of prior user sessions represented in session length mapping 150.

Probability P, based on times $t_0$ and $t_1$, can be calculated as follows:

$$P = v_1/v_0$$

Decay agent 140 can provide the probability to authentication engine 130. Score update module 132 can calculate the updated authentication confidence score as follows:

$$s_1 = s_0 * P$$

Authentication confidence score 134 may be replaced with the updated (and possibly reduced) authentication confidence score, $s_1$. It will be apparent that decay agent 140 and authentication engine 130 may be divided or partitioned in any desired manner and that a single computation may be performed to update the authentication confidence score 134:

$$s_1 = s_0 * v_1/v_0$$

By way of example, this calculation effectively determines that if 50% of prior user sessions lasted until time $t_0$, but only 25% of prior user sessions lasted until time $t_1$, then based on this user history, the user is half as likely to be on the system at time $t_1$ as time $t_0$. An example pseudo-code representation of an algorithm to determine the updated (and possibly reduced) authentication confidence score could be the following:

GetDecayedScore(auth_score, auth_time, current_time, session_length_mapping)
    return auth_score*session_length_mapping [current_time]/session_length_mapping [auth_time]

In this pseudo-code, the variables are the following:

```
auth_score    = authentication confidence score
current_time  = t₁
auth_time     = t₀
session_length_mapping = session length mapping 150
```

In at least one embodiment, this algorithm results in an authentication confidence score dropping (or decaying) when a session time passes a typical time when the user completes certain tasks. For example, consider a mobile phone user with the following behavior patterns for the absolute session times indicated:

30 seconds—checks email messages
    2 minutes—reads email messages
    5 minutes—writes email messages
    10 minutes—browses favorite websites In this scenario, accurate drops in confidence could occur every time the session passes one of these typical behaviors.

After 30 seconds of session time, the user may be done and thus the confidence score can be reduced to reflect this. However, if other factors restore the authentication confidence score (e.g., user provided additional authentication evidence, authentication engine 140 gathered additional authentication evidence), for example, at time 6 minutes, then the typical pattern is that the user could be on the system for another 4 minutes at least. This is the case because the next typical session ending is not until absolute session time 10 minutes.

In some cases, certain platforms may have similar behavior patterns. A mobile phone, for example, may have behavior patterns that typically involve quick checks and some sustained activity at certain times throughout the day. Work stations (e.g., at an office) may have behavior patterns that correspond to work hours, bathroom breaks, and lunch breaks. Notebooks may have behavior patterns that correspond to meetings, etc. These examples are intended as illustrations only, and are not intended to be limiting. It will be appreciated that behavior patterns on any particular platform depends upon its user and purpose.

Embodiments disclosed herein provide the advantage of decaying an authentication confidence score according to real world user behavior patterns, and by a value that is based on real probabilities learned from observing a user. Additionally, embodiments disclosed herein are based on absolute session time, which is a session time relative to the start of a session. Thus, in a scenario in which a user often works 10 hours a day, the decay in the score between the 8th and 9th hours should be minimal to the decay in confidence in the first hour of a session. Furthermore, by reflecting actual use models (e.g., checking mail, browsing the web, etc.) the values have a basis in logic and real world activities. For example, if a user authenticated his notebook at 35 minutes, the authentication confidence score may not be reduced until about 60 minutes, when the user is typically done with a one hour meeting. Thus, the actual user behavior drives the authentication confidence score.

Figure 2:
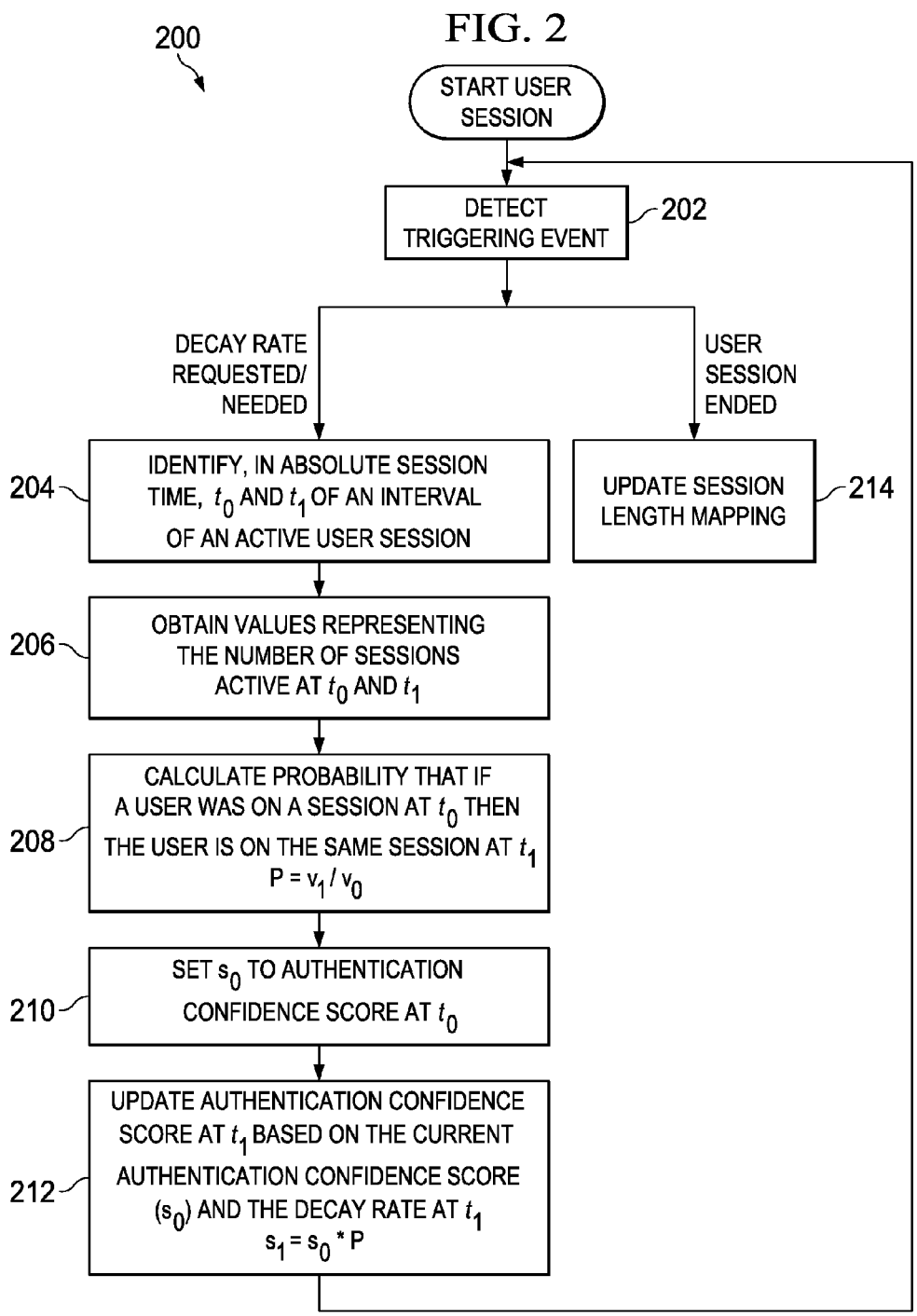
FIG. 2 is a simplified flowchart illustrating potential operations associated with the authentication system in accordance with an embodiment.

Turning to FIG. 2, an example flowchart illustrates a possible flow 200 of operations that may be associated with embodiments described herein. In at least one embodiment, a set of operations corresponds to activities of FIG. 2. Client 100, or a portion thereof, may utilize the set of operations. Client 100 may comprise means such as processor 112, for performing the operations. In an embodiment, one or more operations of flow 200 may be performed by session length update module 136, score update module 132, and/or decay agent 140.

Flow 200 may begin at 202, where a triggering event is detected. A triggering event could be detected, for example, by decay module 140 when authentication engine 130 requests a new decay rate based on certain session times. Another triggering event could be the expiration of a predetermined interval of time after which a new decay rate is to be calculated. Yet another triggering event could be the end of a user session.

If the triggering event is the need for a new decay rate, then at 204, a beginning time to and an ending time $t_1$ of a selected interval of an active user session are identified, in absolute session time. In one example, authentication agent 140 may provide one or both of times $t_0$ and $t_1$ to decay agent 140. In this instance, $t_1$ could be the current absolute session time of the active user session, or even a possible future absolute session time, if such a calculation is needed. The beginning time $t_0$ could be an absolute session time of the last positive authentication, which may be the last time that the decay rate was calculated. In another example, decay agent 140, or some other entity accessible to decay agent 140, may keep track of the session time of the last positive authentication. In this instance, the absolute session time of the last positive authentication and the current absolute session time of the active user session may be used as beginning time $t_0$ and ending time $t_1$, respectively.

In another scenario, ending time $t_1$ could be a future absolute session time if such a calculation is desired. For example, authentication engine 130 may be configured to update authentication confidence score 134 on an as needed basis. One possible approach for this configuration includes authentication engine 130 determining the next possible session time (in the future) of the user session when a typical user activity should end, based on the historical session length data. This future session time may coincide with a reduction in authentication confidence. Therefore, authentication engine may 'go to sleep' until the future session time arrives. At that point, authentication engine could 'wake up' and request a decay rate from decay agent 140.

Once times $t_0$ and $t_1$ have been identified, at 206, decay agent 140 can obtain values that are mapped to times $t_0$ and $t_1$ in session length mapping 150. One value can represent one or more prior user sessions that lasted at least as long as time $t_0$ and another value can represent one or more prior user sessions that lasted at least as long as $t_1$.

At 208, decay agent 140 may calculate a decay rate, which is the probability that, if a user was on a session at $t_0$, then the user is on the same session at $t_1$, using an equation such as: $P=v_1/v_0$. Once the probability is calculated, decay agent 140 can provide this value to authentication engine 130. At 210, a variable ($s_0$) that represents the authentication confidence score at time $t_0$ may be set to the current authentication confidence score. At 212, score update module 132 can update authentication confidence score for $t_1$, which is represented by variable $s_1$. The following equation is one example of an equation that could be used to determine the authentication confidence score: $s_1=s_0*P$. This new authentication confidence score for the active user session can be stored as authentication confidence score 134. It should be noted that the equations provided herein are for illustrative purposes only, and that any number of different equations may be used to determine an authentication confidence score.

With reference again to 202, if the detected triggering event is the termination of a user session, then flow may pass to 214. At 214, session length update module 136 may update session length mapping 150 with session length data associated with the terminated user session. In one example, the portion of session length mapping 150 that corresponds to how long the user session lasted is increased.

FIGS. 3-6 are graphs representing a possible scenario of an example user, context attributes, and a client, in accordance with embodiments disclosed herein. In this example scenario, the client is a mobile phone, such as a smart phone, and the user is at home in the morning. For the given context attributes (e.g., time of day, location) typical behavior of this user can include checking for urgent emails, reading urgent emails, writing reply emails if needed, placing phone calls in some in certain cases.

Figure 3:
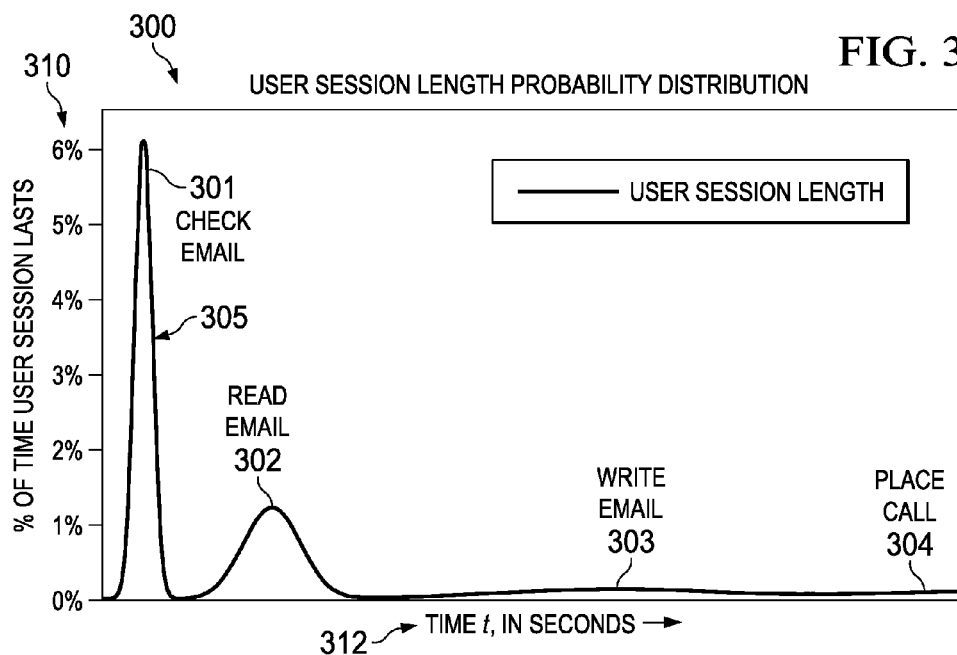
FIG. 3 is a graph illustrating an example user session length probability distribution in accordance with an embodiment.

FIG. 3 is a graph 300 illustrating the probability distribution of user session length on the mobile phone. The percentages of time a user session lasts 310 are shown on a y-axis of graph 300, and time t 312 is shown on an x-axis of graph 300. The user's past sessions are charted in graph 300, where for each activity 301, 302, 303, 304), a curve 305 shows the probability of that activity taking that specific amount of time. An area under the curve shows the probability of that particular activity.

Example curve 305 shows that checking email 301 typically takes the user a few seconds and does not vary much in length. If the user chooses to read email, then the activity of reading email 302 is longer than simply checking email 301 and varies in the time taken to finish the activity. Curve 305 illustrates that the session can range over a long period of time when the user chooses to write an email 303. Similarly, curve 305 also illustrates that the session time can be significant if the user chooses to make a phone call 304.

Thus, curve 305 represents the probability distribution function over the user's session lengths on the mobile phone for these context attributes (e.g., at home in the morning). Authentication system 160 can then determine the percentage of user sessions that last for a given time period. This can be determined by a cumulative distribution of graph 300, inverted (i.e., 1–cumulative distribution function (session length)).

Figure 4:
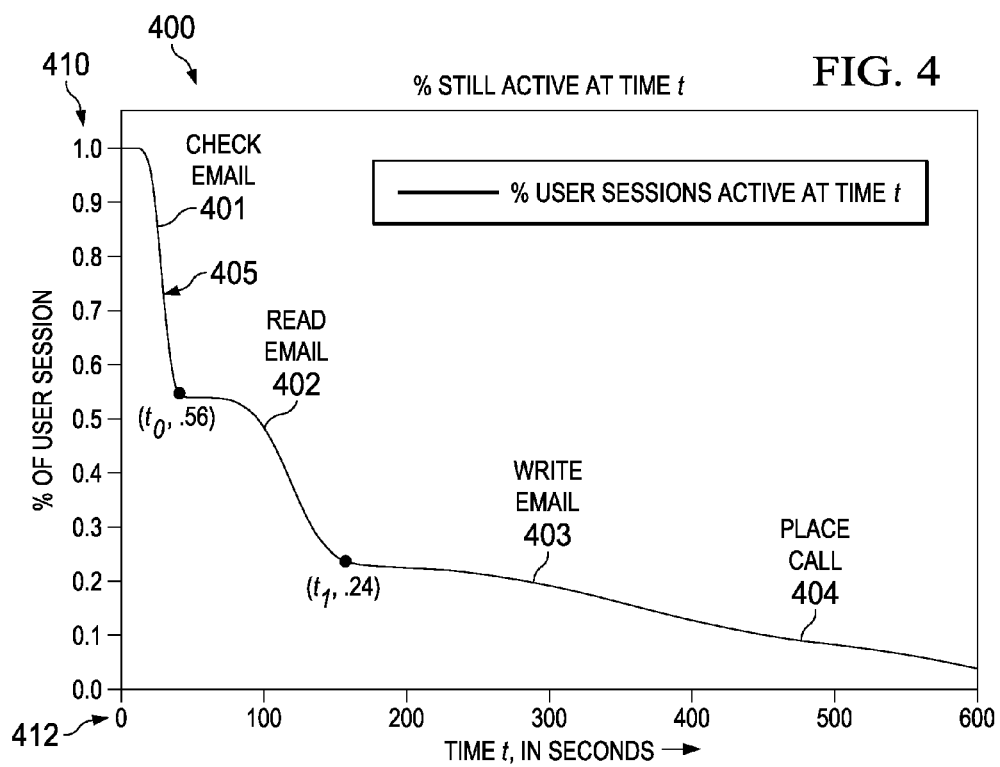
FIG. 4 is a graph illustrating an example percentage of active user sessions at time t in accordance with an embodiment.

FIG. 4 is a graph 400 illustrating the percentage of user sessions 410, on the client that are still active at time t 412. The percentage of user sessions 410 are shown on a y-axis of graph 400, and time t 412 is shown on an x-axis of graph 400. Graph 400 is a cumulative distribution function of graph 300, inverted. Curve 405 represents percentages of activities 401, 402, 403, and 404 that are still active at time t. Activities 401-404 correlate to activities 301-304, respectively, of probability distribution graph 300 of FIG. 3.

Using graph 400, a probability that a user session will be active at a given time (e.g., $t_1$) can be calculated if the user session was active at a previous time (e.g., $t_0$). By way of illustration, if a user session is active at $t_0$ then a probability (P) that the user session will still be active at $t_1$ can be calculated using the following equation, as previously discussed herein:

$$P=p_1/p_0$$

$p_0$=percentage of past user sessions that lasted at least until time $t_0$ $p_1$=percentage of past user sessions that lasted at least until time $t_1$ Thus, for the example $t_0$ and $t_1$ shown in FIG. 4, the probability that the user session is still active at $t_1$ is: $P=p_0/p_1=0.24/0.56=0.43$. This probability value can be used as a decay rate over the time interval $[t_0, t_1]$. Consequently, decay rates are based on the actual user behavior associated with the detected context attributes over that absolute session time interval.

An updated (and possibly reduced) authentication confidence score $(s_1)$ can then be calculated using the following formula: $s_1=s_0*p_0/p_1$. Thus, for the example $t_0$ and $t_1$ shown in FIG. 4, the updated authentication confidence score at $t_1$ is: $s_1=s_0*p_0/p_1=s_0*0.43$.

Figure 5:
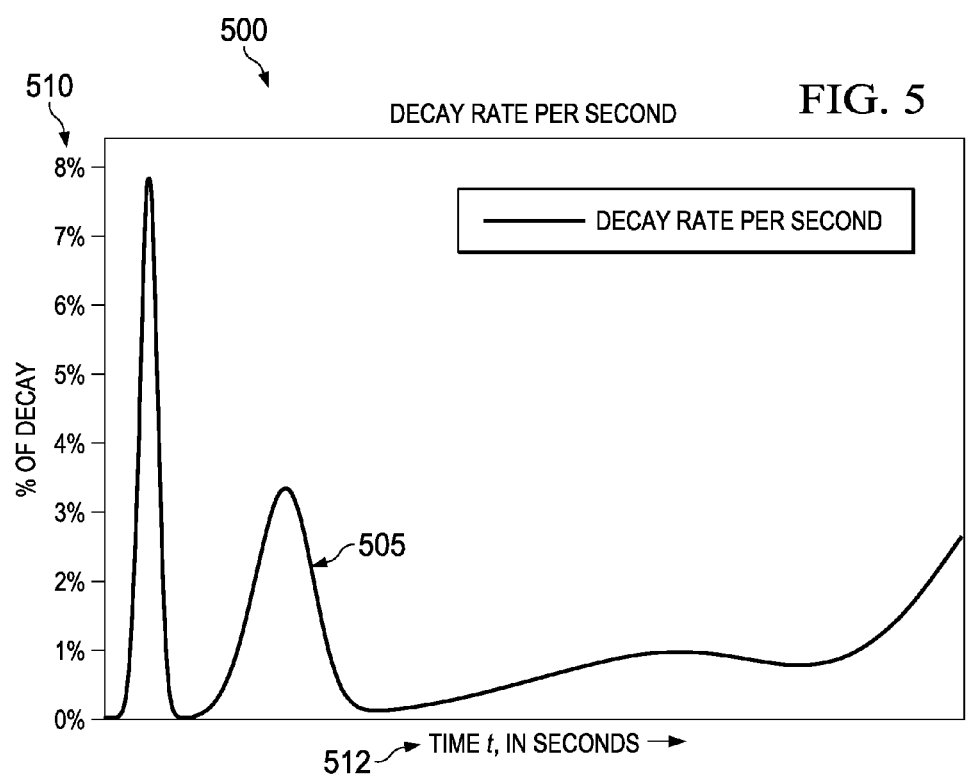
FIG. 5 is a graph illustrating an example decay rate per second for an authentication confidence score in accordance with an embodiment.

FIG. 5 is a graph 500 illustrating the actual decay rate per second to be applied to an authentication confidence score. More specifically, graph 500 illustrates a percentage 510 for an authentication confidence score of a user session to be reduced at particular times t 512 when the user session is still active. In this example, a curve 505 represents the decay rate per second and appears to follow a similar pattern as the user session length probability distribution graph 300. If a user session often ends at a particular given time, then the decay rate should cause the authentication confidence score to decay rapidly. Conversely, if a user session rarely ends at a given time, then the decay rate should cause the authentication confidence score to decay slowly.

Figure 7:
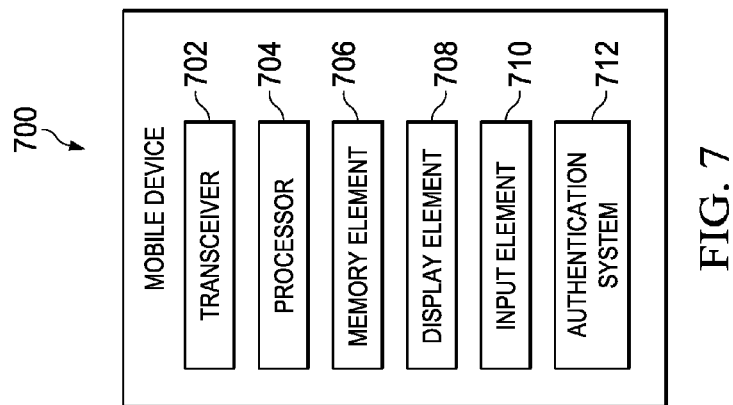
FIG. 7 is a block diagram of an example mobile device according to an embodiment.
Figure 6:
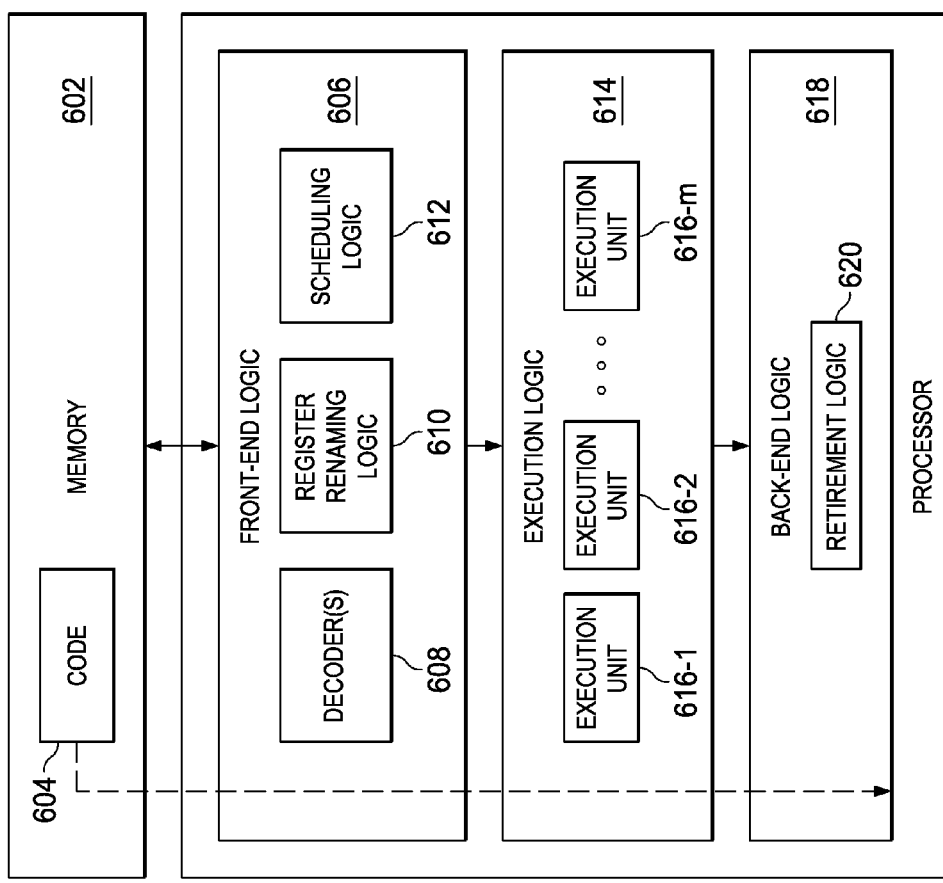
FIG. 6 is a block diagram of a memory coupled to an example processor according to an embodiment.
Figure 8:
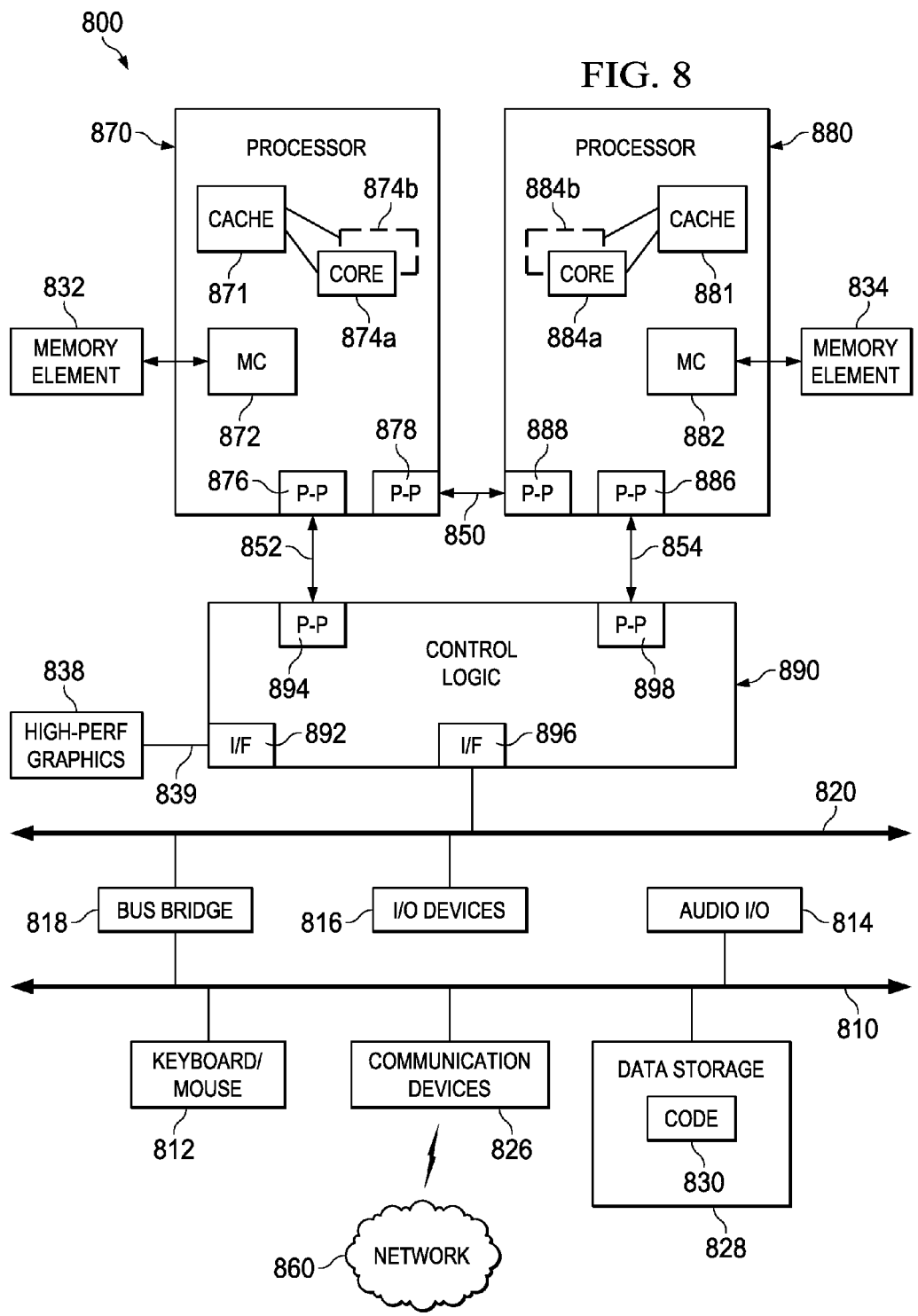
FIG. 8 is a block diagram of an example computing system that is arranged in a point-to-point (PtP) configuration according to an embodiment.

FIGS. 6-8 are block diagrams of exemplary computer architectures that may be used in accordance with embodiments disclosed herein. Other computer architecture designs known in the art for processors, mobile devices, and computing devices, and network elements may also be used. Generally, suitable computer architectures for embodiments disclosed herein can include, but are not limited to, configurations illustrated in FIGS. 6-8.

FIG. 6 is an example illustration of a processor according to an embodiment. Processor 600 is one embodiment of processor 112 of client platform 100.

Processor 600 may be any type of processor, such as a microprocessor, an embedded processor, a digital signal processor (DSP), a network processor, a multi-core processor, a single core processor, or other device to execute code. Although only one processor 600 is illustrated in FIG. 6, a processing element may alternatively include more than one of processor 600 illustrated in FIG. 6. Processor 600 may be a single-threaded core or, for at least one embodiment, the processor 600 may be multi-threaded in that it may include more than one hardware thread context (or "logical processor") per core.

FIG. 6 also illustrates a memory 602 coupled to processor 600 in accordance with an embodiment. Memory 602 is one embodiment of memory element 114 of client platform 100. Memory 602 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Code 604, which may be one or more instructions to be executed by processor 600, may be stored in memory 602. Code 604 can include instructions of various modules (e.g., decay agent 140, score update module 132, session length update module 136, user-session control 122) that may be stored in software, hardware, firmware, or any suitable combination thereof, or in any other internal or external component, device, element, or object where appropriate and based on particular needs. In one example, processor 600 can follow a program sequence of instructions indicated by code 604. Each instruction enters a front-end logic 606 and is processed by one or more decoders 608. The decoder may generate, as its output, a micro operation such as a fixed width micro operation in a predefined format, or may generate other instructions, microinstructions, or control signals that reflect the original code instruction. Front-end logic 606 also includes register renaming logic 610 and scheduling logic 612, which generally allocate resources and queue the operation corresponding to the instruction for execution.

Processor 600 can also include execution logic 614 having a set of execution units $616_1$ through $616_m$. Some embodiments may include a number of execution units dedicated to specific functions or sets of functions. Other embodiments may include only one execution unit or one execution unit that can perform a particular function. Execution logic 614 can perform the operations specified by code instructions.

After completion of execution of the operations specified by the code instructions, back-end logic 618 can retire the instructions of code 604. In one embodiment, processor 600 allows out of order execution but requires in order retirement of instructions. Retirement logic 620 may take a variety of known forms (e.g., re-order buffers or the like). In this manner, processor 600 is transformed during execution of code 604, at least in terms of the output generated by the decoder, hardware registers and tables utilized by register renaming logic 610, and any registers (not shown) modified by execution logic 614.

Although not shown in FIG. 6, a processing element may include other elements on a chip with processor 600. For example, a processing element may include memory control logic along with processor 600. The processing element may include I/O control logic and/or may include I/O control logic integrated with memory control logic. The processing element may also include one or more caches. In some embodiments, non-volatile memory (such as flash memory or fuses) may also be included on the chip with processor 600.

Referring now to FIG. 7, a block diagram is illustrated of an example mobile device 700. Mobile device 700 is one example of a client platform, such as client platform 100 described herein. In an embodiment, mobile device 700 operates as a transmitter and a receiver of wireless communications signals. Specifically, in one example, mobile device 700 may be capable of both transmitting and receiving cellular network voice and data mobile services. Mobile services include such functionality as full Internet access, downloadable and streaming video content, as well as voice telephone communications.

Mobile device 700 may correspond to a conventional wireless or cellular portable telephone, such as a handset that is capable of receiving "3G", or "third generation" cellular services. In another example, mobile device 700 may be capable of transmitting and receiving "4G" mobile services as well, or any other mobile service.

Examples of devices that can correspond to mobile device 700 include cellular telephone handsets, smartphones, and tablets such as those capable of Internet access, email, and instant messaging communications, and portable video receiving and display devices, along with the capability of supporting telephone services. It is contemplated that those skilled in the art having reference to this specification will readily comprehend the nature of modern smartphones, tablets, and telephone handset devices and systems suitable for implementation of the different aspects of this disclosure as described herein. As such, the architecture of mobile device 700 illustrated in FIG. 7 is presented at a relatively high level. Nevertheless, it is contemplated that modifications and alternatives to this architecture may be made and will be apparent to the reader, such modifications and alternatives contemplated to be within the scope of this description.

In an aspect of this disclosure, mobile device 700 includes a transceiver 702, which is connected to and in communication with an antenna. Transceiver 702 may be a radio frequency transceiver. Also, wireless signals may be transmitted and received via transceiver 702. Transceiver 702 may be constructed, for example, to include analog and digital radio frequency (RF) 'front end' functionality, circuitry for converting RF signals to a baseband frequency, via an intermediate frequency (IF) if desired, analog and digital filtering, and other conventional circuitry useful for carrying out wireless communications over modern cellular frequencies. Transceiver 702 is connected to a processor 704, which may perform the bulk of the digital signal processing of signals to be communicated and signals received, at the baseband frequency. Processor 704 can provide a graphics interface to a display element 708, for the display of text, graphics, and video to a user. Processor 704 may include an embodiment as shown and described with reference to processor 600 of FIG. 6.

In an aspect of this disclosure, processor 704 may be a processor that can execute any type of instructions to achieve authentication confidence operations on mobile devices, as detailed herein. Processor 704 may also be coupled to a memory element 706 for storing information to be used in achieving the authentication confidence operations. In an example embodiment, mobile device 700 may be designed with a system-on-a-chip (SoC) architecture, which integrates many or all components of the mobile device into a single chip, in at least some embodiments. In an aspect of this disclosure, memory element 706 of mobile device 700 may also include authentication system 100, as described herein.

FIG. 8 illustrates a computing system 800 that is arranged in a point-to-point (PtP) configuration according to an embodiment. In particular, FIG. 8 shows a system where processors, memory, and input/output devices are interconnected by a number of point-to-point interfaces. In at least one embodiment, client platform 100, shown and described herein, may be configured in the same or similar manner as exemplary computing system 800.

Processors 870 and 880 may also each include integrated memory controller logic (MC) 872 and 882 to communicate with memory elements 832 and 834. In alternative embodiments, memory controller logic 872 and 882 may be discrete logic separate from processors 870 and 880. Memory elements 832 and/or 834 may store various data to be used by processors 870 and 880 in achieving operations associated with distributed malware detection of potentially affected systems, as outlined herein.

Processors 870 and 880 may be any type of processor, such as those discussed with reference to processor 600 of FIG. 6 and processor 112 of FIG. 1. Processors 870 and 880 may exchange data via a point-to-point (PtP) interface 850 using point-to-point interface circuits 878 and 888, respectively. Processors 870 and 880 may each exchange data with a control logic 890 via individual point-to-point interfaces 852 and 854 using point-to-point interface circuits 876, 886, 894, and 898. As shown herein, control logic is separated from processing elements 870 and 880. However, in an embodiment, control logic 890 is integrated on the same chip as processing elements 870 and 880. Also, control logic 890 may be partitioned differently with fewer or more integrated circuits. Additionally, control logic 890 may also exchange data with a high-performance graphics circuit 838 via a high-performance graphics interface 839, using an interface circuit 892, which could be a PtP interface circuit. In alternative embodiments, any or all of the PtP links illustrated in FIG. 8 could be implemented as a multi-drop bus rather than a PtP link.

Control logic 890 may be in communication with a bus 820 via an interface circuit 896. Bus 820 may have one or more devices that communicate over it, such as a bus bridge 818 and I/O devices 816. Via a bus 810, bus bridge 818 may be in communication with other devices such as a keyboard/mouse 812 (or other input devices such as a touch screen, trackball, joystick, etc.), communication devices 826 (such as modems, network interface devices, or other types of communication devices that may communicate through a computer network 860), audio I/O devices 814, and/or a data storage device 828. Data storage device 828 may store code 830, which may be executed by processors 870 and/or 880. In alternative embodiments, any portions of the bus architectures could be implemented with one or more PtP links.

The computer system depicted in FIG. 8 is a schematic illustration of an embodiment of a computing system that may be utilized to implement various embodiments discussed herein. It will be appreciated that various components of the system depicted in FIG. 8 may be combined in a system-on-a-chip (SoC) architecture or in any other suitable configuration capable of achieving the reduction of authentication confidence based on user history, according to the various embodiments provided herein.

Note that with the examples provided herein, interaction may be described in terms of authentication system 160 managing an authentication confidence score based on only a decay rate. However, this has been done for purposes of clarity and example only. It should be appreciated that authentication system 160 and its teachings may be combined with other suitable authentication evidence that indicates whether an authenticated user is present or not present during an active user session on a client. Moreover, authentication system 160 is readily scalable and can be implemented across a large number of components, as well as more complicated/sophisticated arrangements and configurations. Accordingly, the examples provided should not limit the scope or inhibit the broad teachings of authentication system as potentially applied to a myriad of other architectures.

It is also important to note that the operations described with reference to FIGS. 1-5, illustrate only some of the possible authentication confidence activities that may be executed by, or within, authentication system 160. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments of authentication system 160 in that any suitable arrangements, chronologies, configurations, and timing mechanisms may be provided without departing from the teachings of the present disclosure.

As used herein, unless expressly stated to the contrary, use of the phrase 'at least one of' refers to any combination of the named elements, conditions, or activities. For example, 'at least one of X, Y, and Z' is intended to mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements, that are not necessarily limited by any order, rank, importance, temporal sequence, or hierarchy of the two elements.

Although the present disclosure has been described in detail with reference to particular arrangements and configurations, these example configurations and arrangements may be changed significantly without departing from the scope of the present disclosure. Additionally, although authentication system 160 has been illustrated with reference to particular elements and operations that facilitate the authentication confidence activities, these elements and operations may be replaced by any suitable architecture, protocols, and/or processes that achieve the intended functionality of authentication system 160.

OTHER NOTES AND EXAMPLES

The following examples pertain to embodiments in accordance with this Specification.

Example A1 is an apparatus to manage an authentication confidence score, the apparatus comprising: at least one processor, at least one memory element, at least one module adapted, when executed by the processor, to: identify, in absolute session time, in absolute session time, a beginning time and an ending time of an interval of an active user session on a client, determine a first value representing a first subset of a set of prior user sessions, wherein the prior user sessions of the first subset were active for at least as long as the beginning time, determine a second value representing a second subset of the set of prior user sessions, wherein the prior user sessions of the second subset were active for at least as long as the ending time, and determine, based on the first and second values, a decay rate for the authentication confidence score of the active user session.

In Example A2, the subject matter of Example 1 can optionally include the at least one module further adapted, when executed by the processor, to: divide the second value by the first value to determine the decay rate.

In Example A3, the subject matter of any one of Examples A1-A2 can optionally include the at least one module further adapted, when executed by the processor, to: reduce the authentication confidence score based on the decay rate.

In Example A4, the subject matter of any one of Examples A1-A3 can optionally include the beginning time corresponding to a last positive authentication, and the ending time corresponding to a current time of the active user session.

In Example A5, the subject matter of any one of Examples A1-A4 can optionally include a storage structure including session length data for each one of the prior user sessions of the set, wherein the session length data includes the first and second values mapped to the beginning and ending times, respectively.

In Example A6, the subject matter of Example A5 can optionally include the at least one module further adapted, when executed by the processor, to: update the storage structure to include session length data of the active user session when the active user session terminates.

In Example A7, the subject matter of any one of Examples A1-A6 can optionally include the prior user sessions of the set being distinguished from other prior user sessions by one or more context attributes.

In Example A8, the subject matter of Example A7 can optionally include the one or more context attributes including at least one of: time of day, day of a period of days, location of the client, position of the client, a type of document being accessed, a type of application being executed, weather, ambient light, a network to which the client is connected, and a device to which the client is connected.

In Example A9, the subject matter of any one of Examples A7-A8 can optionally include the active user session of the client being distinguished from the other prior user sessions by the one or more context attributes.

In Example A10, the subject matter of any one of Examples A1-A6 can optionally include the prior user sessions of the set being distinguished from other prior user sessions by a first context attribute, and wherein at least some of the other prior user sessions are distinguished by a second context attribute.

In Example A11 the subject matter of any one of Examples A1-A10 can optionally include the first and second values being one of percentages and absolute session numbers.

In Example A12, the subject matter of any one of Examples A1-A11 can optionally include none of the prior user sessions of the set being established on the client.

In Example A13 the subject matter of any one of Examples A1-A11 can optionally include each of the prior user sessions of the set being established on the client.

Example C1 is at least one machine readable storage medium having instructions stored thereon to manage an authentication confidence score, the instructions when executed by a processor cause the processor to: identify, in absolute session time, a beginning time and an ending time of an interval of an active user session on a client; determine a first value representing a first subset of a set of prior user sessions, wherein the prior user sessions of the first subset were active for at least as long as the beginning time; determine a second value representing a second subset of the set of prior user sessions, wherein the prior user sessions of the second subset were active for at least as long as the ending time; and determine, based on the first and second values, a decay rate for the authentication confidence score of the active user session.

In Example C2, the subject matter of Example C1 can optionally include the instructions when executed by the processor further cause the processor to: divide the second value by the first value to determine the decay rate.

In Example C3, the subject matter of any one of Examples C1-C2 can optionally include the instructions when executed by the processor further cause the processor to: reduce the authentication confidence score based on the decay rate.

In Example C4, the subject matter of any one of Examples C1-C3 can optionally include the beginning time corresponding to a last positive authentication, and the ending time corresponding to a current time of the active user session.

In Example C5, the subject matter of any one of Examples C1-C4 can optionally include a storage structure including session length data for each one of the prior user sessions of the set, wherein the session length data includes the first and second values mapped to the beginning and ending times, respectively.

In Example C6, the subject matter Example C5 can optionally include the instructions when executed by the processor further cause the processor to: update the storage structure to include session length data of the active user session when the active user session terminates.

In Example C7, the subject matter of any one of Examples C1-C6 can optionally include the prior user sessions of the set being distinguished from other prior user sessions by one or more context attributes.

In Example C8, the subject matter of Example C7 can optionally include the one or more context attributes including at least one of: time of day, day of a period of days, location of the client, position of the client, a type of document being accessed, a type of application being executed, weather, ambient light, a network to which the client is connected, and a device to which the client is connected.

In Example C9, the subject matter of any one of Examples C7-C8 can optionally include the active user session of the client being distinguished from the other prior user sessions by the one or more context attributes.

In Example C10, the subject matter of any one of Examples C1-C6 can optionally include the prior user sessions of the set being distinguished from other prior user sessions by a first context attribute, and wherein at least some of the other prior user sessions are distinguished by a second context attribute.

In Example C11, the subject matter of any one of Examples C1-C10 can optionally include the first and second values being one of percentages and absolute session numbers.

In Example C12, the subject matter of any one of Examples C1-C11 can optionally include none of the prior user sessions of the set being established on the client.

In Example C13, the subject matter of any one of Examples C1-C11 can optionally include each of the prior user sessions of the set being established on the client.

Example M1 is a method for managing an authentication confidence score, comprising: identifying, in absolute session time, a beginning time and an ending time of an interval of an active user session on a client; determining a first value representing a first subset of a set of prior user sessions, wherein the prior user sessions of the first subset were active for at least as long as the beginning time; determining a second value representing a second subset of the set of prior user sessions, wherein the prior user sessions of the second subset were active for at least as long as the ending time; and determining, based on the first and second values, a decay rate for the authentication confidence score of the active user session.

In Example M2, the subject matter Example M1 can optionally include reducing the authentication confidence score based on the decay rate.

In Example M3, the subject matter of any one of Examples M1-M2 can optionally include dividing the second value by the first value to determine the decay rate.

In Example M4, the subject matter of any one of Examples M1-M3 can optionally include the beginning time corresponding to a last positive authentication, and the ending time corresponding to a current time of the active user session.

In Example M5, the subject matter of any one of Examples M1-M4 can optionally include a storage structure including session length data for each one of the prior user sessions of the set, wherein the session length data includes the first and second values mapped to the beginning and ending times, respectively.

In Example M6, the subject matter of Example M5 can optionally include updating the storage structure to include session length data of the active user session when the active user session terminates.

In Example M7, the subject matter of any one of Examples M1-M6 can optionally include the prior user sessions of the set being distinguished from other prior user sessions by one or more context attributes.

In Example M8, the subject matter of Example M7 can optionally include the one or more context attributes including at least one of: time of day, day of a period of days, location of the client, position of the client, a type of document being accessed, a type of application being executed, weather, ambient light, a network to which the client is connected, and a device to which the client is connected.

In Example M9, the subject matter of any one of Examples M7-M8 can optionally include the active user session of the client being distinguished from the other prior user sessions by the one or more context attributes.

In Example M10, the subject matter of any one of Examples M1-M6 can optionally include the prior user sessions of the set being distinguished from other prior user sessions by a first context attribute, and wherein at least some of the other prior user sessions are distinguished by a second context attribute.

In Example M11, the subject matter of any one of Examples M1-M10 can optionally include the first and second values being one of percentages and absolute session numbers.

In Example M12, the subject matter of any one of Examples M1-M11 can optionally include none of the prior user sessions of the set being established on the client.

In Example M13, the subject matter of any one of Examples M1-M11 can optionally include each of the prior user sessions of the set being established on the client.

Example E1 is an apparatus for managing an authentication confidence score, comprising means for: identifying, in absolute session time, a beginning time and an ending time of an interval of an active user session on a client; determining a first value representing a first subset of a set of prior user sessions, wherein the prior user sessions of the first subset were active for at least as long as the beginning time; determining a second value representing a second subset of the set of prior user sessions, wherein the prior user sessions of the second subset were active for at least as long as the ending time; and determining, based on the first and second values, a decay rate for the authentication confidence score of the active user session.

In Example E2, the subject matter of Example E1 can optionally include reducing the authentication confidence score based on the decay rate.

In Example E3, the subject matter of any one of Examples E1-E2 can optionally include dividing the second value by the first value to determine the decay rate.

In Example E4, the subject matter of any one of Examples E1-E3 can optionally include the beginning time corresponding to a last positive authentication, and the ending time corresponding to a current time of the active user session.

In Example E5, the subject matter of any one of Examples E1-E4 can optionally include a storage structure including session length data for each one of the prior user sessions of the set, wherein the session length data includes the first and second values mapped to the beginning and ending times, respectively.

In Example E6, the subject matter of Example E5 can optionally include updating the storage structure to include session length data of the active user session when the active user session terminates.

In Example E7, the subject matter of any one of Examples E1-E6 can optionally include the prior user sessions of the set being distinguished from other prior user sessions by one or more context attributes.

In Example E8, the subject matter of Example E7 can optionally include the one or more context attributes including at least one of: time of day, day of a period of days, location of the client, position of the client, a type of document being accessed, a type of application being executed, weather, ambient light, a network to which the client is connected, and a device to which the client is connected.

In Example E9, the subject matter of any one of Examples E7-E8 can optionally include the active user session of the client being distinguished from the other prior user sessions by the one or more context attributes.

In Example E10, the subject matter of any one of Examples E1-E6 can optionally include the prior user sessions of the set being distinguished from other prior user sessions by a first context attribute, and wherein at least some of the other prior user sessions are distinguished by a second context attribute.

In Example E11, the subject matter of any one of Examples E1-E10 can optionally include the first and second values being one of percentages and absolute session numbers.

In Example E12, the subject matter of any one of Examples E1-E11 can optionally include none of the prior user sessions of the set being established on the client.

In Example E13, the subject matter of any one of Examples E1-E11 can optionally include each of the prior user sessions of the set being established on the client.

Example X1 is a machine-readable storage medium including machine-readable instructions, when executed, to implement a method or realize an apparatus as claimed in any one of claims 1-13.

What is claimed is:

1. An apparatus, the apparatus comprising:
   at least one processor;
   at least one memory; and
   at least a set of executable instructions stored within the memory, wherein the executable instructions, when executed by the at least one processor, are to:
   detect a triggering event that indicates a new decay rate is to be calculated;
   identify a beginning time and an ending time associated with an interval of time during an active user session on a client device associated with a user, wherein the beginning time is to indicate a first absolute session time measured from a start of the active user session to a last positive authentication of the active user session, and wherein the ending time is to indicate a second absolute session time measured from the start of the active user session to a later time occurring after the last positive authentication;
   determine a first value based, at least in part, on a first number of prior user sessions of a first subset of a set of prior user sessions that are no longer active, wherein a session length of each of the prior user sessions of the first subset was at least as long as the beginning time;
   determine a second value based, at least in part, on a second number of prior user sessions of a second subset of the set of prior user sessions, wherein a session length of each of the prior user sessions of the second subset was at least as long as the ending time;
   determine a decay rate for a current authentication confidence score by dividing the second value by the first value; and
   determine an updated authentication confidence score by multiplying the current authentication confidence score by the decay rate.

2. The apparatus of claim 1, wherein the executable instructions, when executed by the at least one processor, are to:
   reduce the authentication confidence score based on the decay rate.

3. The apparatus of claim 1, wherein the interval of time is to occur before the active user session terminates.

4. The apparatus of claim 1, wherein a session length mapping includes session length data for each one of the prior user sessions of the set, wherein the session length mapping includes the first and second values mapped to the beginning and ending times, respectively.

5. The apparatus of claim 4, wherein the executable instructions, when executed by the at least one processor, are to:
update the session length mapping to include session length data of the active user session when the active user session terminates.

6. The apparatus of claim 1, wherein the prior user sessions of the set are distinguished from other prior user sessions by one or more context attributes.

7. The apparatus of claim 6, wherein the one or more context attributes include at least one of: a time of day, a day of a period of days, a location of the client device, a position of the client device, a type of document being accessed, a type of application being executed, weather, ambient light, a network to which the client device is connected, or a device to which the client device is connected.

8. The apparatus of claim 6, wherein the active user session of the client device is distinguished from the other prior user sessions by the one or more context attributes.

9. The apparatus of claim 1, wherein the prior user sessions of the set are distinguished from other prior user sessions by a first context attribute, and wherein at least some of the other prior user sessions are distinguished by a second context attribute.

10. The apparatus of claim 1, wherein the first and second values are percentages or absolute numbers.

11. The apparatus of claim 1, wherein none of the prior user sessions of the set was established on the client device.

12. The apparatus of claim 1, wherein at least some of the prior user sessions of the set were established on the client device.

13. At least one non-transitory machine readable storage medium having instructions stored thereon, the instructions when executed by a processor cause the processor to:
detect a triggering event that indicates a new decay rate is to be calculated;
identify a beginning time and an ending time associated with an interval of time during an active user session on a client device associated with a user, wherein the beginning time is to indicate a first absolute session time measured from a start of the active user session to a last positive authentication of the active user session, and wherein the ending time is to indicate a second absolute session time measured from the start of the active user session to a later time after the last positive authentication;
determine a first value based, at least in part, on a first number of prior user sessions of a first subset of a set of prior user sessions that are no longer active, wherein a session length of each of the prior user sessions of the first subset was at least as long as the beginning time;
determine a second value based, at least in part, on a second number of prior user sessions of a second subset of the set of prior user sessions, wherein a session length of each of the prior user sessions of the second subset was at least as long as the ending time;
determine a decay rate for a current authentication confidence score by dividing the second value by the first value; and
determine an updated authentication confidence score by multiplying the current authentication confidence score by the decay rate.

14. The at least one non-transitory machine readable storage medium of claim 13, wherein the instructions when executed by the processor further cause the processor to:
reduce the authentication confidence score based on the decay rate.

15. The at least one non-transitory machine readable storage medium of claim 13, wherein a session length mapping includes session length data for each one of the prior user sessions of the set, wherein the session length mapping includes the first and second values mapped to the beginning and ending times, respectively.

16. The at least one non-transitory machine readable storage medium of claim 15, wherein the instructions when executed by the processor further cause the processor to:
update the session length mapping to include session length data of the active user session when the active user session terminates.

17. The at least one non-transitory machine readable storage medium of claim 13, wherein the prior user sessions of the set are distinguished from other prior user sessions by one or more context attributes.

18. The at least one non-transitory machine readable storage medium of claim 17, wherein the one or more context attributes include at least one of: a time of day, a day of a period of days, a location of the client device, a position of the client device, a type of document being accessed, a type of application being executed, weather, ambient light, a network to which the client device is connected, or a device to which the client device is connected.

19. The at least one non-transitory machine readable storage medium of claim 13, wherein the first and second values are percentages or absolute numbers.

20. A method, comprising:
detecting a triggering event that indicates a new decay rate is to be calculated;
identifying a beginning time and an ending time associated with an interval of time during an active user session on a client device associated with a user, wherein the beginning time indicates a first absolute session time measured from a start of the active user session to a last positive authentication of the active user session, and wherein the ending time indicates a second absolute session time measured from the start of the active user session to a later time occurring after the last positive authentication;
determining a first value based, at least in part, on a first number of prior user sessions of a first subset of a set of prior user sessions that are no longer active, wherein a session length of each of the prior user sessions of the first subset was at least as long as the beginning time;
determining a second value based, at least in part, on a second number of prior user sessions of a second subset of the set of prior user sessions, wherein a session length of each of the prior user sessions of the second subset was at least as long as the ending time;
determining a decay rate for a current authentication confidence score by dividing the second value by the first value; and
determining an updated authentication confidence score by multiplying the current authentication confidence score by the decay rate.

21. The method of claim 20, wherein the prior user sessions of the set are distinguished from other prior user sessions by one or more context attributes.

* * * * *